(12) United States Patent
Wong et al.

(10) Patent No.: US 6,889,229 B1
(45) Date of Patent: May 3, 2005

(54) TECHNIQUES FOR PEER-TO-PEER REPLICATION OF OBJECTS IN A RELATIONAL DATABASE

(75) Inventors: Lik Wong, Union City, CA (US); James W. Stamos, Saratoga, CA (US); Subramanian Muralidhar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 617 days.

(21) Appl. No.: 09/968,617

(22) Filed: Sep. 28, 2001

(51) Int. Cl.[7] .............................................. G06F 17/30
(52) U.S. Cl. ...................................................... 707/102
(58) Field of Search .................................. 707/102, 10

(56) References Cited

U.S. PATENT DOCUMENTS 5,687,363 A * 11/1997 Oulid-Aissa et al. .......... 707/4
5,862,325 A * 1/1999 Reed et al. ................. 709/201
6,175,835 B1 * 1/2001 Shadmon .................... 707/102

* cited by examiner

*Primary Examiner*—Wayne Amsbury
(74) *Attorney, Agent, or Firm*—Hickman Palermo Truong & Becker LLP

(57) ABSTRACT

Techniques for replicating a database object of a relational database managed by a database system from a first node on a network to a second node on the network include determining that the database object on the first node includes a user-defined object. A first routine of the database system is invoked. The first routine performs the step of copying the database object to the second node of the network. The first routine copies a name of a user-defined defined type of the user-defined object from the first node to the second node. The first routine also copies a first definition of the user-defined type from the first node to the second node. The first routine then copies a second definition of the database object from the first node to the second node. The second definition includes the name of the user-defined type. These techniques provide the benefits of peer-to-peer replication in a distributed database to users of object-relational databases that including user-defined objects.

62 Claims, 8 Drawing Sheets

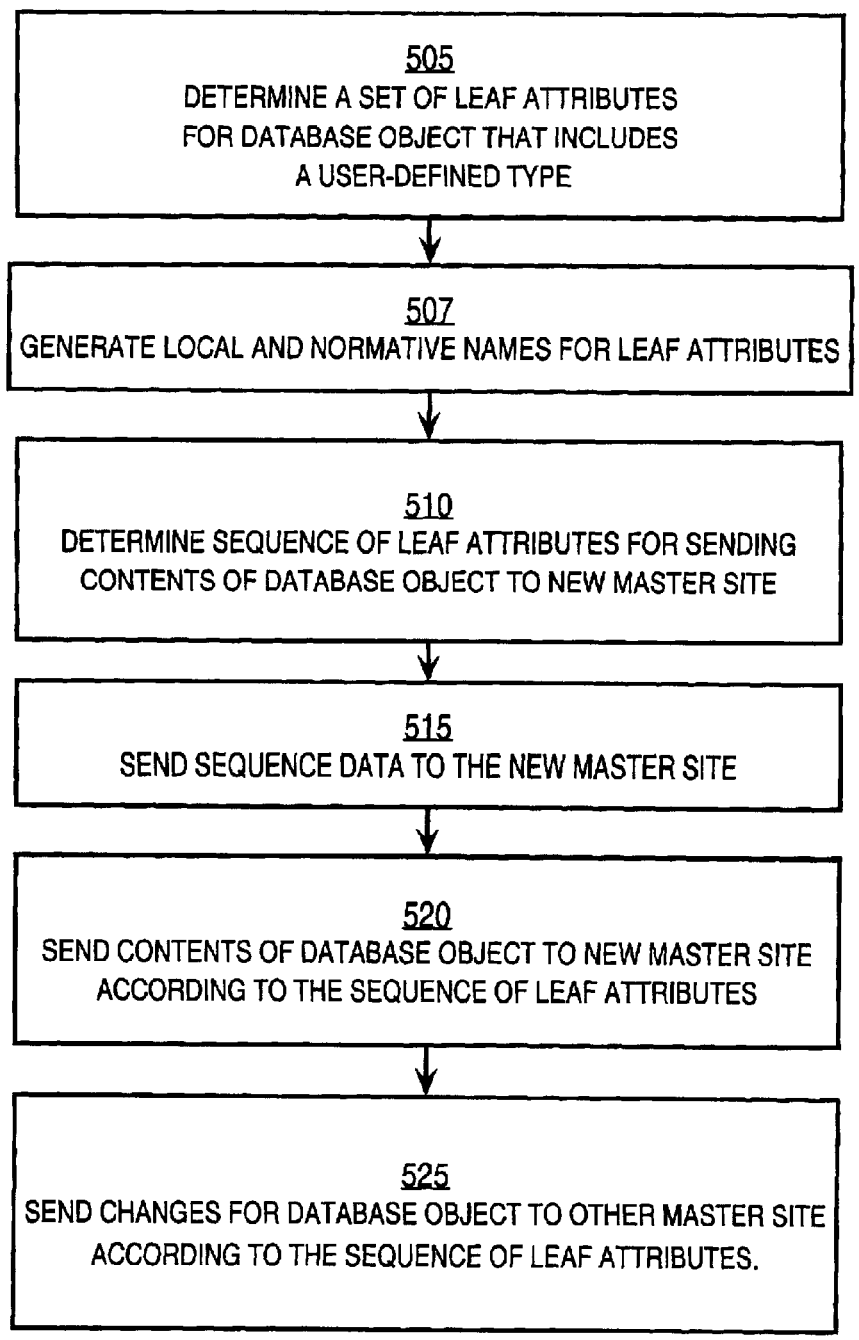

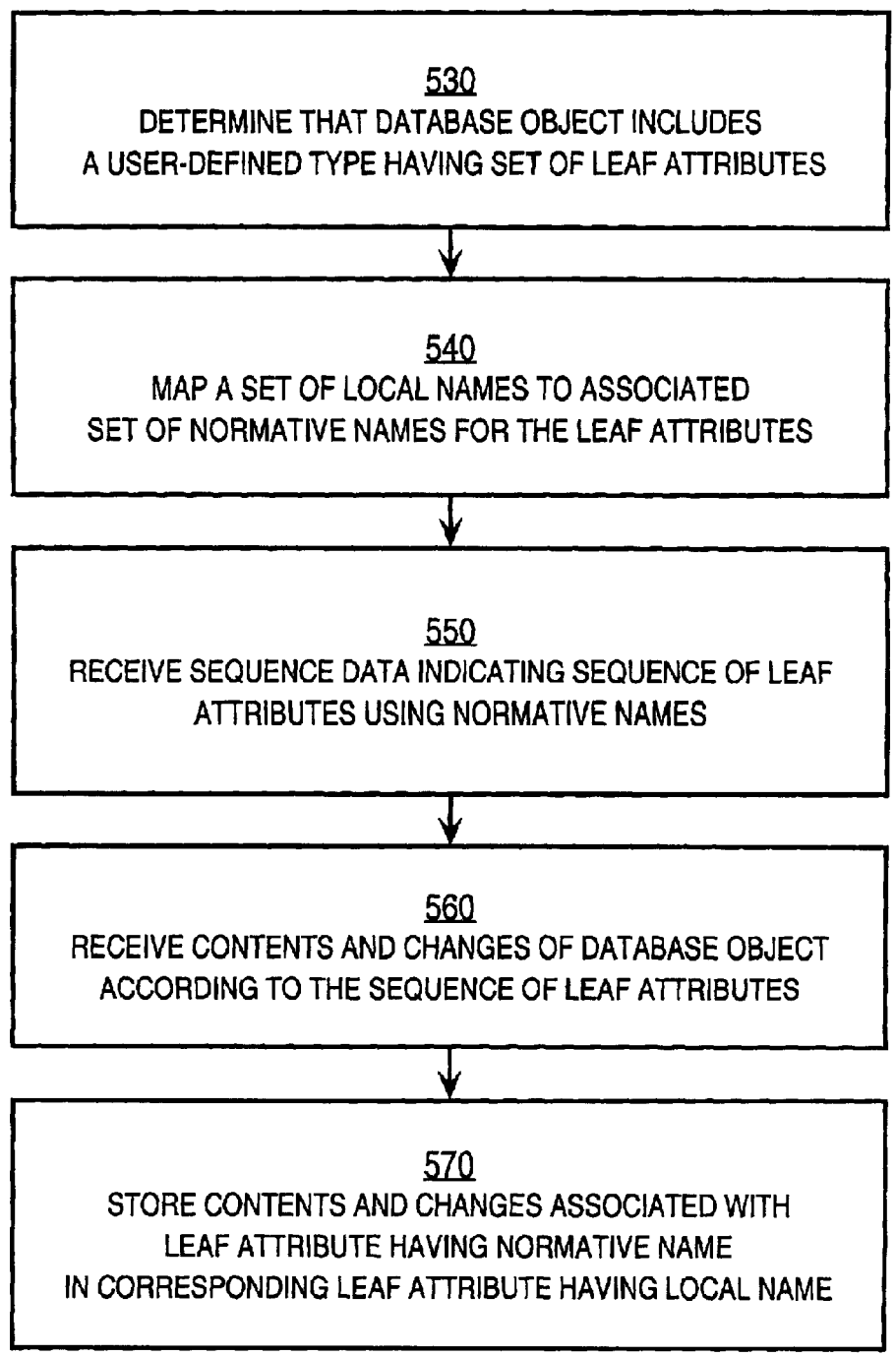

US 6,889,229 B1

TECHNIQUES FOR PEER-TO-PEER REPLICATION OF OBJECTS IN A RELATIONAL DATABASE

FIELD OF THE INVENTION

The present invention relates to replicating database objects from one node on a network to another node, and, in particular, to replicating database objects including user-defined objects in a distributed relational database system.

BACKGROUND OF THE INVENTION

A database is made up of one or more database objects. Database objects are logical data structures that are used by a database server to store and organize both data in the database and procedures that operate on the data in the database. For example, in a relational database system, a table is a database object with data arranged in rows, each row having one or more columns representing different attributes or fields. Another database object in the relational database is a database view of certain rows and columns of one or more database tables. Another database object in the relational database is an index of values in a key column in a database table that points to the rows in the table having a particular value in the key column. Another database object in the relational database is a database trigger, a procedure that is executed in response to a particular event, such as the insertion of a row into a database table.

Data manipulation operations include adding a row, deleting a row, and modifying contents of a row, among others. Database definition operations include adding a table, adding a column to a table, and adding an index to a table, among others. Another database object in the relational database is a package of procedures that may be invoked and executed by the database server. A data dictionary is a table that stores information about the columns in each table in the database and the users who may access each table.

An object-relational database allows users to define classes and to generate, store and retrieve, in a relational database, multiple user-defined objects based on each class. An object is said to be an instance of the class that defines it. A class has a name that uniquely identifies the class, one or more elements ("attributes") to hold values that describe an object of the class, and one or more methods to perform on the values in the attributes. Each attribute has a type.

Database systems include built-in types. Built-in types vary with different database systems, but typically include a logical type (holding one of two values corresponding to "true" and "false"), several integer types (each having one of several pre-defined lengths), several floating decimal point number types (each having one of several lengths), a character type, a string type (made up of one or more characters), and a date (including numbers representing year, month, day, hour, minute, second).

A class and the objects instantiated from the class have a type that is made up of the combination of the types of the attributes in the class. A user-defined object has a user-defined object type that is not a built-in type. For example, a user-defined class named "Street_Address" has a "Street_Number" attribute that is a short integer built-in type, a "Street_Name" attribute that is a character string built-in type, and an "Apt_Number" attribute that is another string built-in type. The user-defined object type is named for the class; the user-defined object type is a "street_address" type that is a combination of built-in types short integer, string, string. The street_address type is not a built-in type.

One user-defined class may have another user-defined class as an attribute. For example, a user-defined class named "Address" has a Street_Address attribute that is a street_address type, a "City_Name" attribute that is a string built-in type, a "State_Name" attribute that is another string built-in type, a "Zip_Code" attribute that is a short integer built-in type, and a "Country" attribute that is another string built-in type. The object type "address" is a combination of types street_address, string, string, short integer, string. Expanding the street_address type into the built-in types of its elements, the object type "address" is a combination of built-in types short integer, string, string, string, string, short integer, string. The address type is not a built-in type.

The object-relational database allows user-defined objects to be stored in a database object, such as a table. For example, the object-relational database allows an employee table to store Street_Address objects of street_address type. In a table, a column type indicates the type of data stored in the column. Thus, the employee table includes a particular column having a column type of the street_address type for storing objects of the street_address type.

Data in a database is often shared among many users for multiple applications. For example, data in an employee database of a multinational corporation is shared among corporate officials and personnel for accounting, payroll and human resources departments, each running a different application program that uses data in the database. The applications send queries to a common database server. Based on the queries, the database server retrieves data from the database or changes the database—such as by adding, deleting or modifying the data in the database objects, or by adding, deleting or modifying the structure of the database objects themselves.

In many circumstances, it is advantageous to copy some or all of the database objects constituting the database to multiple sites on a network. Replication is the process of copying and maintaining database objects in multiple databases that make up a distributed database system. Changes applied at one site are captured and stored locally before being forwarded and applied at each of the other sites. Alternatively, changes applied at one site cal also be synchronously forwarded and applied at each of the other sites. The process for propagating to other sites the changes that are made to replicated database objects, and then making corresponding changes to the copy of the objects at the other sites, is called convergence or synchronization. Replication provides a user at any site with fast, local access to shared data. Replication also enhances availability of the database and the applications that employ the database because, if one site goes down, the database at another site can be accessed for data retrieval and for updating.

When replicating a database onto a new node that does not have a copy of the database, a problem arises when the database contains a user-defined type for user-defined objects. Conventional procedures invoked for replicating database objects onto the new node do not allow for user-defined types within a database object.

Conventional replication of a database object on a new node typically involves (1) obtaining the data dictionary for the database object, (2) creating the data structures of the database object on the new node based on the data dictionary, and then (3) moving data into the data structures on the new node. When the data dictionary indicates a database object includes a user-defined type for a user-defined object, the conventional routines are unable to proceed because the user-defined type is not yet defined on the new node. The data received at the new master site is used by a database server on the new master site to create the database objects of the replication group at the new master site. According to the conventional replication, there is no data in the data structure on the new master site that defines the user-defined type. The database server on the new master site uses the data structure for user-defined types on the new master site to determine the meaning of user-defined types. Therefore, the database server on the new master site is unable to interpret the name for the user-defined type included in the data received for the data dictionary. The database server on the new master site cannot create the database object nor fill it with data. Replication of the database object fails. Thus, replication fails for a database if one database object in the database includes a user-defined type.

Even if the replication did not fail because of the new master site's inability to interpret the name for the user-defined type, other problems still may arise. For example, code already written for marshalling contents from columns with built-in types into a series of bytes for transfer to the new master site may be extended to marshal contents from columns with user-defined types. Code written for un-marshalling the series of bytes received at the new master site would also be extended to un-marshal the bytes received into contents for columns with the user-defined types. The user-defined types may be arbitrarily complex, with user-defined types based on other user-defined types, with repeated columns with the same user-defined types, with references and with backpointers to cyclic structures. The code to extend the marshalling and un-marshalling can become quite complex. Executing such complex code can significantly slow the process of replicating database objects that include user-defined types. Furthermore, producing such complex code is expensive and prone to error.

Another problem is that database commands for inserting and updating rows in a table with user-defined columns can become complex. For example, consider a Structured Query Language (SQL) statement that inserts into a table named "Employee" a value in a column named "Home" of user-defined type "Address" which includes an embedded user-defined type of "street_address." If the data to be inserted into the row does not include a street_address, then an SQL insert statement may take the form of INSERT INTO EMPLOYEE (Home) VALUES (Address (null, 'San Francisco', 'CA', '94000')).

This SQL statement causes the database system to invoke a type constructor process for the user-defined type "Address" and passes the constructor values for the four attributes of the Address type (Street_Address, City_Name, State_Name, and Zip_Code). Because no value is inserted for the Street_Address, a type constructor for the user-defined type "street_address" is not needed. However, if the data to be inserted included a street address, then the SQL statement would take the form of INSERT INTO EMPLOYEE (Home) VALUES (Address (Street_Address(123, 'Main Street', null), 'San Francisco', 'CA', '94000')).

This SQL statement causes the database system to also invoke a type constructor process for the user-defined type "Street_Address" and passes the constructor values for the three attributes of the street_address type (Street_Number, Street_Name, and Apt_Number).

For rows with many user-defined types, each with embedded user-defined types that may include further embedded user-defined types down several layers, the SQL statement can become quite complex as a result of a combinatorial explosion. When the change caused by this insert is replicated to the new master site, additional complex code at the new master site is invoked to generate and execute the complex SQL statement to reproduce the insert at the new master site. Generating such long SQL statements and executing them can significantly slow the process of replicating changes to database objects that include user-defined types. Furthermore, producing such complex code is expensive and prone to error. Among other functions, the complex code must distinguish between a null for a built-in type and an atomic null for a user-defined type. Software code that already performs replication for database objects with built-in types provides a copy of the database objects with attributes that have the same names on the new master site as on the original master site. In some circumstance it is desirable that the attributes have different names on the new master site. For example, an application developed for users at the new master site may use a column called "EmpID" of type string for an employee identification number. At the old master site the same information may be in a column called "empno" of type string. Rather than change the application used at the new master site, it is advantageous to replicate the data in column "empno" at the old master site into the column "EmpID" at the new master site.

Based on the foregoing, there is a clear need for techniques that provide the benefits of peer-to-peer replication for object-relational databases.

Furthermore, there is a clear need for techniques that replicate database objects with user-defined objects while avoiding the costs of producing complex code to marshal and un-marshal arbitrarily complex user-defined types and avoiding the low performance caused by executing such code.

In addition, there is a clear need for techniques that replicate database objects with user-defined objects while avoiding the combinatorial explosion of SQL statements.

There is also a clear need for techniques that replicate database objects with different attribute names on the new master site than at the old master site.

SUMMARY OF THE INVENTION

Techniques are provided for replicating a database object of a relational database managed by a database system from a first node on a network to a second node on the network. In one aspect of the invention, the method includes determining that the database object on the first node includes an object defined by a user of the database system (a "user-defined" object). A novel object-transfer routine of the database system is invoked. The object-transfer routine copies the database object to the second node of the network. In one embodiment, the object-transfer routine performs the copy by copying (1) the name of a user-defined type of the user-defined object; (2) the definition of the user-defined type; and (3) the definition of the database object. The definition of the database object includes the name of the user-defined type. The object-transfer routine causes the database object to be instantiated on the second node. The object-transfer routine copies data from the database object on the first node into the database object on the second node.

According to another aspect of the invention, techniques are provided for use within a relational database system for generating on a second node a replicated database object based on a particular database object on a first node. The techniques include receiving sequence data at the second node. The sequence data indicates a sequence of identifiers for attributes of the particular database object. A series of values from the first node are also received at the second node. The series of values are stored within the replicated database object at locations based on the sequence data and a mapping between the attributes of the particular database object and attributes of the replicated database object. According to another aspect of the invention, techniques for use within the relational database system include determining a sequence for sending values of attributes of the particular database object to the second node. Sequence data indicating the sequence are sent to the second node. The sequence data includes a built-in type defined by the database system and a user-defined name for each attribute in the sequence. A series of values from the particular database object is sent to the second node based on the sequence.

According to another aspect of the invention, techniques for use within the relational database system include determining a set of leaf attributes corresponding to a particular attribute of the particular database object. The particular attribute has a user-defined type. Each leaf attribute in the set has a built-in type defined by the database system and a leaf name. Each value of the user-defined type that resides in the particular attribute is sent as a set of values corresponding to the set of leaf attributes.

These techniques provide the benefits of peer-to-peer replication in a distributed database to users of object-relational databases that include user-defined objects.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a flowchart that illustrates steps performed by a database server for sending a user-defined object according to an embodiment of one step of the method depicted in FIG. 3;

FIG. 5B is a flowchart that illustrates steps performed by a database server for receiving a user-defined object according to an embodiment of one step of the method depicted in FIG. 3;

DETAILED DESCRIPTION OF THE PREFERRED EMBODIMENT

Techniques for replication of database objects in an object-relational database are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Structural Components

Figure 1:
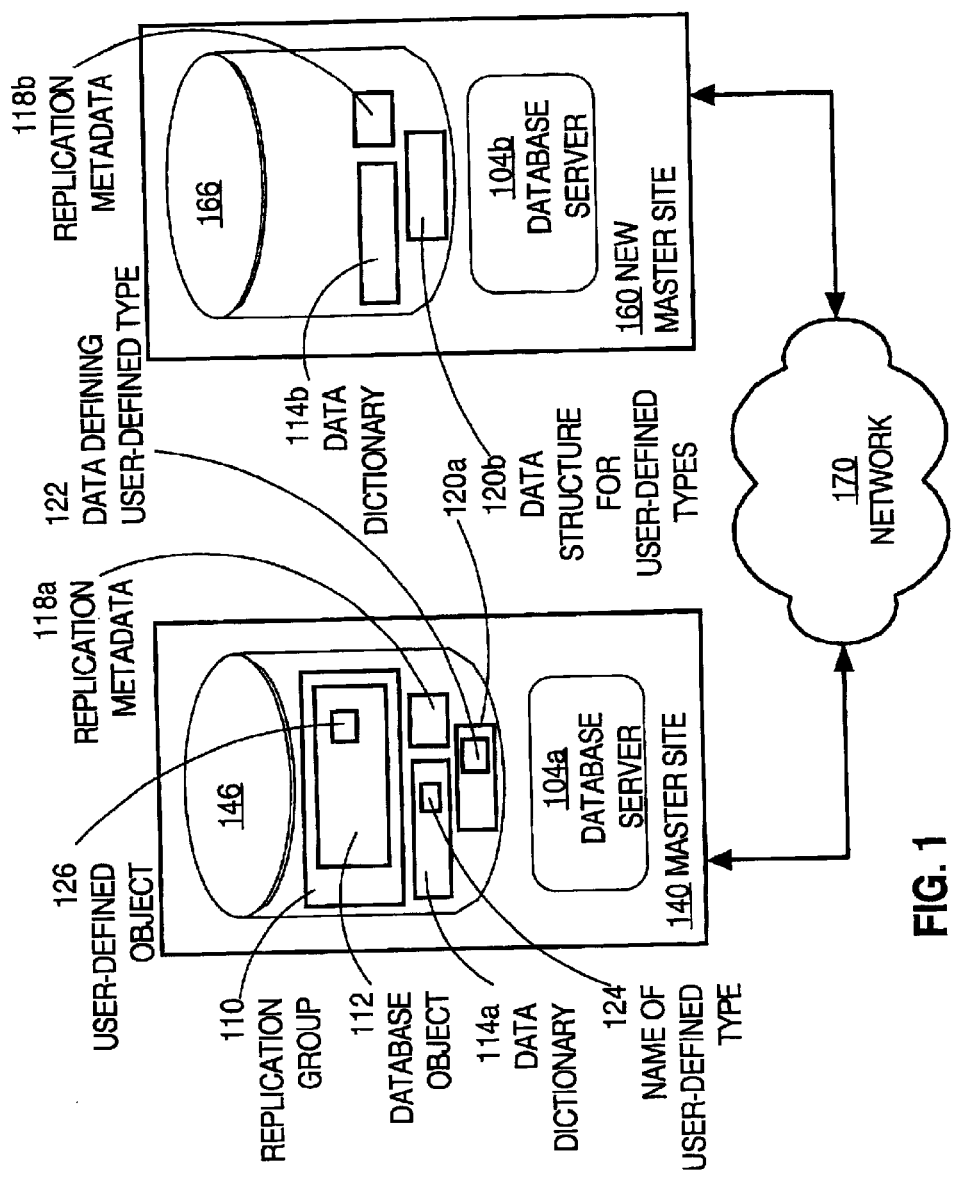
FIG. 1 is a block diagram that illustrates a distributed database in which a database object of an object-relational database is replicated to a new node, according to one embodiment.

FIG. 1 is a block diagram that illustrates a distributed database in which a database object 112 is replicated to a new node 160, according to one embodiment.

A first master site 140 connected to network 170 includes a database server 104a and a persistent storage device 146. The database server 104a is configured to support object-relational databases. To support object-relational databases, the database server 104a maintains a data structure 120a for storing data 122 from a user for defining user-defined types. Data 122 defines the class for user-defined objects, and thereby provides a template for forming objects (instances) of the user-defined type. The data includes a name for the user-defined type, a list of attributes and attribute types, and a list of methods that provide the behavior for the user-defined type. For example, data structure 120a on master site 140 includes data 122 that defines a user-defined type named "street_address" as including a "Street_Number" attribute that is a short integer built-in type, a "Street_Name" attribute that is a character string built-in type, and an "Apt_Number" attribute that is another string built-in type.

The database server 104a also maintains a data dictionary 114a, which is a data structure that holds data that describes each database object in a database. For example, the data dictionary may have definition information for a particular table. The definition information in the data dictionary associated with the particular table may indicate the name and type of each column in the table. The name of the particular table may be used by the data dictionary to identify the table that is associated with the particular set of definition information.

A replication group includes one or more database objects for replicating to one or more other master sites of a distributed database. For example, replication group 110 includes database object 112. A more specific example of a database object is an employee table giving the name and address of employees of a company that owns the distributed database. The specific example of this employee table is used repeatedly in the description that follows. Replication metadata 118a includes data that indicates the database objects in the replication group 110.

During replication of object-relational database objects, one or more database objects in the replication group may include a user-defined object, which is an instance of the user-defined type. For example, database object 112 in replication group 110 includes a user-defined object 126. In the more specific example, the employee table is included in the replication group. The employee table includes a column named "AddressPart1" having an instance of a street_address type defined by the user. An instance of the user-defined type occurs in each row in the table. For example, one row contains the object having the triplet of values (123, Main Street, 4B) in the AddressPart1 column for the triplet of types (integer, string, string) in the street_address type.

The data dictionary 114a includes data describing the database object 112, which includes data 124 indicating a name of the user-defined type. For example, the data dictionary 114a includes a description of the employee table. The description of the employee table includes a column named "AddressPart1" having a type named street_address, the user-defined type.

When a new master site is to be added to the distributed database, the new site includes (1) a database server and (2) the data structures maintained by the database server, such as the data dictionary and the data structure for user defined types. However, when created using conventional techniques, the data dictionary and data structure for user-defined types that are created at the new master site usually do not include information about database objects already stored in persistent storage on another site. For example, when a database server is installed on new master site 160, the new master site 160 includes database server 104b, and includes data dictionary 114b and a data structure for user defined types 120b on persistent storage device 166. But the data dictionary 114b and the data structure 120b do not hold any information about the employee table or the user-defined type "street_address" that is available on master site 140.

During conventional replication to a new master site, data from replication metadata 118a about the replication group 110 is sent from the database server 104a on the existing master site 140 to the database server 104b on the new master site 160. The data sent from the replication metadata 118a are stored in the replication metadata 118b on the new master site, and are used by the database server 104b on the new master site to control replication of the replication group 110 on the new master site 160. For example, replication metadata 118a includes the names of the database objects in replication group 110.

During conventional replication to a new master site, data from the data dictionary 114a describing a database object 112 in the replication group 110 is sent from the database server 104a on the existing master site 140 to the database server 104b on the new master site 160. The data from the data dictionary 114a are stored in the data dictionary 114b on the new master site, and are used by the database server 104b on the new master site to create a database object on the new master site 160. Then the data are sent to the new site and placed in the newly created database object.

In an object-relational database, the data in the data dictionary 114a includes the name 124 of each user-defined type. The data in the data dictionary with the user-defined type is sent to the database server 104b according to the conventional replication process. The server 104b on the new master site does not find the name in the data structure 120b for user-defined types and therefore fails to recognize the name of the type. As a consequence, the database server 104b is unable to process the data, and is unable to place the data into the data dictionary 114b on the new master site. Furthermore, without the data in the data dictionary 114b, the database server 104b is unable to create the new database object on the new site 160. In some systems, an error is generated and returned to the first database server 104a.

According to embodiments of the present invention, the replication process is modified to automatically move the data 122 defining a user-defined type from the data structure 120a for user-defined types on the existing master site 140 to the data structure 120b for user-defined types on the new master site 160, before placing data from the data dictionary 114a into the data dictionary 114b on the new master site 160.

According to some embodiments, the replication process is modified to place additional data in the replication metadata 118a to facilitate the transfer of data describing the user-defined objects of each user-defined type. The additional data is described below with reference to FIG. 4.

Functional Overview

Figure 2:
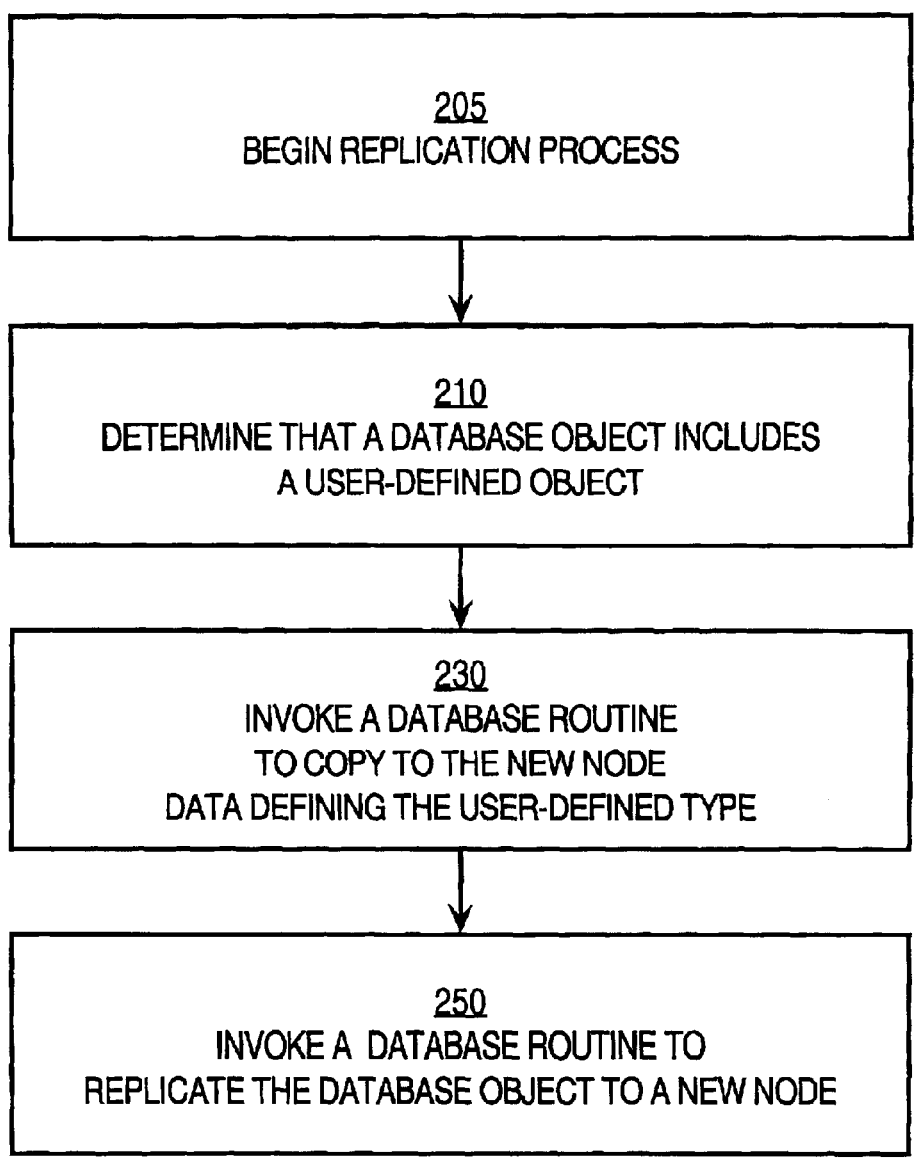
FIG. 2 is a flowchart that illustrates a high level view of a method for replicating a database object including a user-defined object onto a new master site, according to an embodiment.

FIG. 2 is a flowchart that illustrates a high level view of a method 200 for replicating a database object including a user-defined object onto a new master site, according to an embodiment. The method may be implemented using any method known in the art. For example, the steps can be performed in response to commands issued by a database administrator, in some embodiments. In other embodiments, the steps are stored as instructions for a processor and executed upon a single command by a database administrator. In some embodiments, some steps are performed by database routines invoked by instructions that are executed by a processor upon a command by a database administrator or in response to the occurrence of certain events in the database system. In some embodiments, one or more routines of a replication application programming interface (API) for the database server are invoked. Although the steps are illustrated in the following flowcharts in a particular order, the steps may be reordered or occur at overlapping times in other embodiments.

In step 205, a replication process begins. For example, a database server routine is invoked for defining a replication group. For example, to create a replication group with the name FirstRepGroup that includes the employee table named Employees for the user CompanyA, the method invokes routines of an API with the following statements:

CREATE_MASTER_REPGROUP ("FirstRep Group"...);
CREATE_MASTER_REPOBJECT (OWNER= "CompanyA", NAME="Employees", TYPE="table", GROUP="FirstRepGroup", COPY_ROWS= "TRUE"...).

In the above statement, the parameter COPY_ROWS is set to true to indicate that after the table "Employees" is created on new master site 160 as part of the replication group, the rows of the table should be filled with the contents of the table on the existing master site 140. Otherwise, the table is created but no rows are stored in the table.

In step 210, the database server 104a on the existing master site 140 determines that a database object 112 in a replication group 110 includes a user-defined object 126. Any manner known in the art at the time the step is implemented may be employed. For example, in one embodiment, the database server receives input from a database administrator that the replication group includes a database object with a user-defined object. In another embodiment, the database server receives input from the database administrator that one or more particular user-defined types have instances in the replication group. In another embodiment, the database server routine CREATE_MASTER_REPOBJECT automatically determines whether the replication object listed includes a column with a user-defined type. For example, the routine determines from the data dictionary 114a that the table Employees in the replication group FirstRepGroup includes a column type with a name of a user-defined type from the data structure 120a. For every column found with a user-defined type, the name of the user-defined type is added to a user-defined-type list, which is a data structure for listing the user-defined types included in the replication group.

In some embodiments, an object of a user-defined type occupies the entire row of a table. Tables in which each row is an object (instance) of a particular user-defined type are referred to herein as user-defined type tables. The rows of user-defined type tables are called row-objects. According to one embodiment, each user-defined type table is named by the name of the user-defined type associated with the table.

According to one embodiment, the CREATE_MASTER_REPOBJECT routine includes parameters to indicate that a type is a user-defined type. If the parameters provided to CREATE_MASTER_REPOBJECT identify a user-defined type, then the replication group includes user-defined objects. For example, a user-defined type street_address is named "street_address" and is indicated as part of the replication group with the following statement:

CREATE_MASTER_REPOBJECT (OWNER= "CompanyA", NAME="street_address", TYPE= "type", GROUP="FirstRepGroup", . . . ).

where "type" indicates that "street_address" is a user-defined type defined by data in the data structure 120a.

In some embodiments, user-defined types include references to row-objects, and ordered collections of one type (built-in or user-defined) called array types, and unordered collections of one datatype called nesting table types. Array types and nesting table types are both examples of collection types.

In step 230 a database server routine is invoked to copy to the new master site data defining the user-defined types. The user-defined types to be copied are listed in the user-defined-type list filled during step 210. For example, a routine is invoked that copies data 122 from data structure 120a on master site 140 to data structure 120b on new master site 160. By invoking a database server routine to do this copying, a database administrator is freed from having to program a routine with many instructions, or issue a series of commands, to identify the data 122 in the data structure 120a, determine whether conflicting data already reside in data structure 120b on the new master site 160, and, if not, write the data 122 into the data structure 120b.

Step 230 is not performed if the routine invoked in step 250, described next, performs the step of copying data 122 from data structure 120a on master site 140 to data structure 120b on new master site 160, as in the embodiment described below with reference to FIG. 3. After step 230 is performed, a conventional replication process may proceed to instantiate the database object on the new master site without failure, even for database objects including user-defined objects. The replication process will not fail because during copying of the data dictionary 114a, when the data dictionary includes a type that has the name of a user-defined type, the data defining the user-defined type is already on the new master site 160 in the data structure 120b for user-defined types. Thus the type is understood by the database server 104b on the new master site. The type in the data dictionary is interpreted by the database server 104b based on the definition information in the data structure 120b. Using the information in the data structure 120b, the database server 104b creates the replica of the database object on the new master site.

In step 250, a database server routine is invoked to replicate the database object 112 to the new master site 160. More details on step 250 are given for one embodiment in FIG. 3. By invoking a database server routine to do this replication, a database administrator is freed from having to program a routine with many instructions in order to obtain the same result. Without a database server routine, the database administrator would have to (1) write instructions for ensuring the data defining the user-defined types is in data structure 120b, (2) write instructions for generating and placing data for data dictionary 114b based on the data in data dictionary 114a, (3) create the database object on the new master site based on the data in data dictionary 114b, including the name of the user-defined type of the user-defined objects, and (4) fill the database object on the new master site with data from the existing master site.

Conventional database server routines that perform replication allow for many options useful in saving computer resources. For example, the conventional routine allows for old data to be sent, along with new data, and compared in the replicated database to improve accuracy of replication. To save bandwidth when much of the data is known to be valid or cannot be checked, such as with columns having a large amount of binary data, an option is provided to send only the new data and not perform the comparison. When a table is copied without an indication of a primary key, the user is automatically given the option to specify a primary key for an index and other references from other tables. Such options would have to be foregone or supported by writing additional, complex instructions. A database administrator would prefer to have one database server routine perform all these steps and provide these options automatically, rather than write so many instructions.

Database Server Routine

Figure 3:
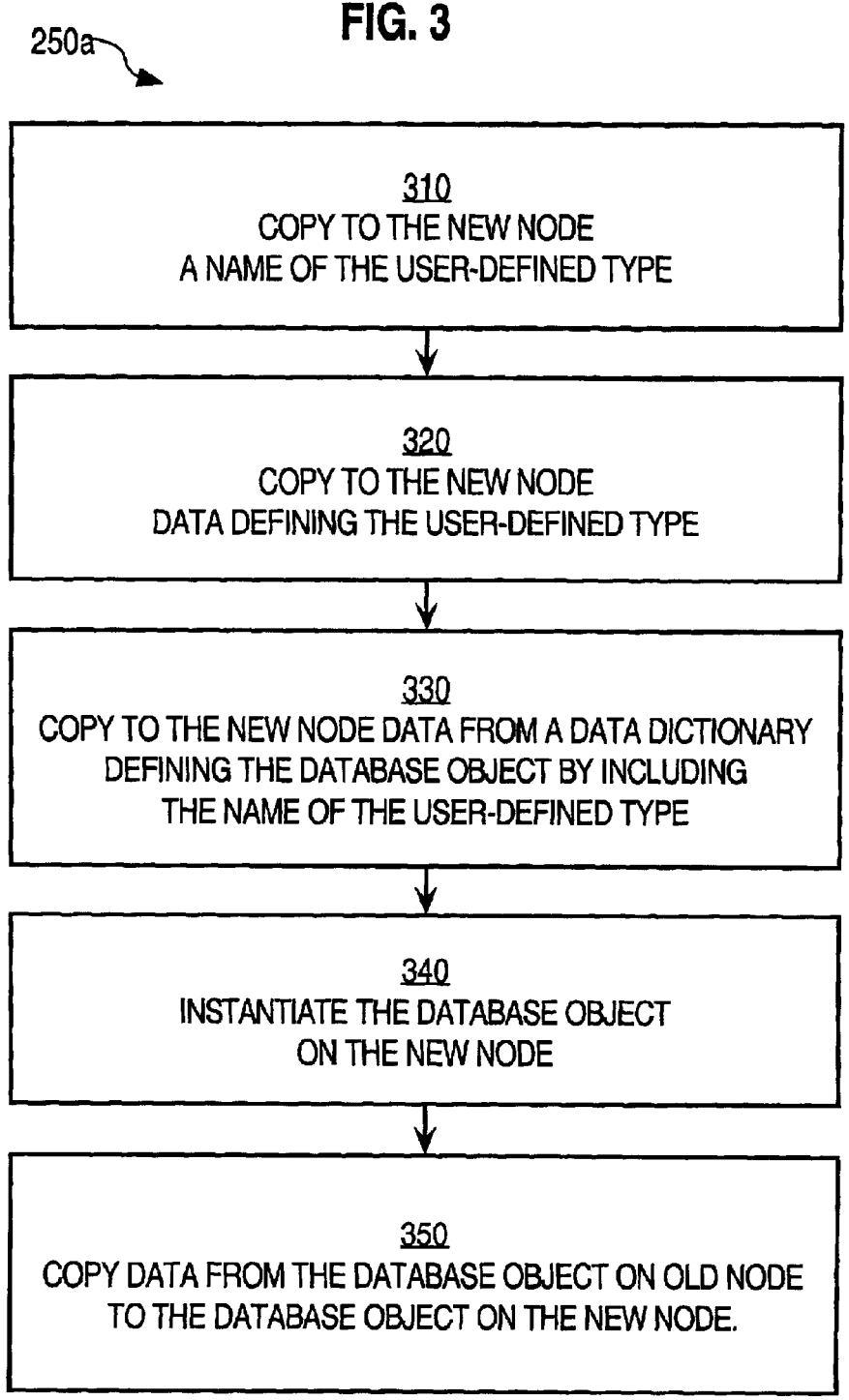
FIG. 3 is a flowchart that illustrates detailed steps performed by a database routine according to an embodiment of one step of the method depicted in FIG. 2.

FIG. 3 is a flowchart that illustrates detailed steps performed by a database server routine according to an embodiment 250a of step 250 of the method depicted in FIG. 2. In embodiments that execute steps 310 and 320 of FIG. 3, the step 230 of FIG. 2 is omitted.

In step 310, the database server 104a copies the name of the user-defined type to the new master site 160. The database server 104a sends data indicating the name to the database server 104b on new master site 160, and database server 104b stores the name. For example, database server 104a sends data indicating the name "street_address" to server 104b, which saves the data indicating the name in data structure 120b.

In step 320, the database server 104a copies the data 122 defining the user-defined type to the new master site 160. The database server 104a sends a copy of the data 122 to the database server 104b on new master site 160, and database server 104b stores the copy of data 122 in data structure 120b. For example, database server 104a sends a copy of the data for a type named street_address to server 104b. The data sent indicates a "Street_Number" attribute that is a short integer built-in type, a "Street_Name" attribute that is a character string built-in type, and an "Apt_Number" attribute that is another string built-in type. Server 104b saves the data in data structure 120b.

In step 330, the database server 104a copies the data defining the database object from the data dictionary 114a on the master site 140 to the data dictionary 114b on new master site 160. The data defining the database object includes the name 124 of the user-defined type. The database server 104a sends a copy of the data defining the database object to the database server 104b on new master site 160, and database server 104b stores the copy of data defining the database object in data dictionary 114b. For example, database server 104a sends a copy of the data defining the Employee table (including a column named AddressPart1 with a column type of user-defined type named "street_address" to server 104b, which saves the data in data dictionary 114b.

In step 340, in response to receiving the data from data dictionary 114a, the database server 104b on the new master site 160 instantiates the database object on the new master site 160 based on the data in the data dictionary 114*b* on the new master site 160. For example, database server 104*b* creates an Employee table having columns including a column of user-defined type "street_address. Server 104*b* is capable of creating a column of type street_address because the data 122 defining that user-defined type is available to server 104*b* in data structure 120*b*. The table is first created without rows.

In step 350, the database server 104*a* copies the data stored in database object 112 on the master site 140 to the database object on new master site 160. The data stored in the database object includes an object 126 of the user-defined type. The database server 104*a* sends a copy of the data stored in database object 112 to the database server 104*b* on new master site 160. The database server 104*b* stores the copy of data including a copy of the object 126 of the user-defined type into the instance of the database object on new master site 160. For example, database server 104*a* sends a copy of the data stored in database object 112 to the database server 104*b* on new master site 160. The data includes EmployeeName "J. Smith" and AddressPart1 object "(123, Main St., 4B)" of user-defined type street_address. The database server 104*b* stores the copy of data including EmployeeName "J. Smith" and AddressPart1 object "(123, Main St., 4B)" of user-defined type street_address into the instance of the database object on new master site 160.

Using the conventional database routines, steps 310 and 320 are not performed before step 330 is attempted, and step 330 fails. Consequently, when conventional techniques are used, replication fails for database objects of object-relational databases that include user-defined objects.

Based on the new routines, step 330 completes successfully because the user-defined data type is already known to the database server 104*b* on the new master site 160 in data structure 120*b*. Therefore, replication of the database object may proceed to completion. These techniques provide the benefits of peer-to-peer replication to users of object-relational databases that include user-defined objects.

Expanding Attributes to Leaf Attributes

Writing software to perform step 350 for database objects that include user-defined objects is complex, costly, and prone to errors. In addition, executing the complex software consumes computational resources that significantly slow replication. Therefore, according to some embodiments, before replication, a database object that includes one or more attributes with user-defined types is expanded to a database object that includes a new set of attributes with only built-in types. After the database object has been "expanded" in this manner, extant routines for marshalling and un-marshalling built-in types may be used during the replication operation. Furthermore, inserts can be performed that do not lead to a combinatorial explosion of SQL code.

In general, a database object includes one or more data items, each data item described by the same set of one or more attributes. For example, a database table includes one or more rows, each row described by the same set of columns. Each attribute has a name and a type that is the same for every data item in the database object. The value of each attribute may vary from one data item to the next. For example, the values in a particular column may differ in each row. In an object-relational database, a database object attribute may have a user-defined type.

Any database object attribute that has a user-defined type can be expanded to several leaf attributes that each has a built-in type. For example, the column named AddressPart1, of the Table Employees, described above, has user-defined type "street_address." The column AddressPart1 can be expanded to three leaf columns with user-defined names "Street_Number," "Street_Name," "Apt_Number," and built-in types number, string, string, respectively. In some embodiments, an auxiliary leaf attribute is included in the set of leaf attributes to indicate whether an attribute of a user-defined type is absent from a particular data item.

Table 1 illustrates the expansion of attributes having multiple layers of user-defined types into multiple leaf attributes for an example table. In this example, the database object is a table named "Emp." The user-defined type "street_address" is embedded in the user-defined type "Address." Each employee data item has two columns of type "Address," a home address column named "HomeAdr," and a work address column named "WorkAdr." In addition a user-defined type "personN" includes five attributes called "Last," "First," "Middle," "Prefix," and "Suffix" all of the built-in string type. To the user, as listed in the first column of Table 1, the Emp table seems to consist of five columns named "EmpID," "EmpName," "HomeAdr," WorkAdr," and "Birth."

TABLE 1

Expansion of Example Columns Having User-Defined Types

| Given Column Name | User-defined Type | user-defined attribute name | embedded user-defined Type | user-defined attribute name | Built-in Type | Local column name |
|---|---|---|---|---|---|---|
| EmpID | | | | | string | C1 |
| EmpName | personN | | | | atomic-null | C2 |
| | | Last | | | string | C3 |
| | | First | | | string | C4 |
| | | Middle | | | string | C5 |
| | | Prefix | | | string | C6 |
| | | Suffix | | | string | C7 |
| HomeAdr | Address | | | | atomic-null | C8 |
| | | AddressPart1 | street_address | | atomic-null | C9 |
| | | | | Street_Number | integer | C10 |
| | | | | Street_Name | string | C11 |
| | | | | Apt_Number | string | C12 |
| | | City_Name | | | string | C13 |
| | | State_Name | | | string | C14 |
| | | Zip_Code | | | string | C15 |

TABLE 1-continued

Expansion of Example Columns Having User-Defined Types

| Given Column Name | User-defined Type | user-defined attribute name | embedded user-defined Type | user-defined attribute name | Built-in Type | Local column name |
|---|---|---|---|---|---|---|
| WorkAdr | Address | | | | atomic-null | C16 |
| | | AddressPart1 | street_address | | atomic-null | C17 |
| | | | | Street_Number | integer | C18 |
| | | | | Street_Name | string | C19 |
| | | | | Apt_Number | string | C20 |
| | | City_Name | | | string | C21 |
| | | State_Name | | | string | C22 |
| | | Zip_Code | | | string | C23 |
| Birth | | | | | date | C24 |
| | | | | | null-image | C25 |

The five columns apparent to the user of the Emp table expand to 25 leaf columns that have built-in types. Local column names for the leaf columns are given in the seventh column, labeled "Local column name." Local column names are described in more detail below. The built-in types for the leaf columns are listed in the sixth column of Table 1, labeled "Built-in Type." The expansion of 5 columns to 25 leaf columns is described with reference to Table 1.

The five columns apparent to the user of the Emp table have column types of string, personN, Address, Address, and date, respectively. The types personN and Address are user-defined types in the first layer. The first layer of user-defined types are listed in the second column of Table 1, labeled "user-defined Type." String and date are built-in types, so the columns with string and date types are each represented by a single leaf column, C1 and C24 respectively.

The EmpName column has a personN user-defined type that has five attributes that are each built-in types. The five attributes can be represented by five leaf columns of the string built-in type, named C3, C4, C5, C6, C7, respectively. An auxiliary leaf column of the atomic-null built-in type is named C2. Leaf column C2 indicates whether the data for the personN type is absent in a particular row. One value (NULL) in column C2 indicates that data is absent, i.e., a data object of type personN is absent in a particular row. A second value (NOT NULL) in column C2 indicates that a data object having five values is present in the row. It is possible that all five values are null values when a data object is present. Usually, however, one of the five columns has a value.

The HomeAdr column has a Address user-defined type that has four attributes. Three attributes (City_Name, State_Name and Zip_Code) have built-in types, and AddressPart1 has a user-defined type. The user-defined type is a street_address type indicated in Table 1 by the fourth column labeled "embedded user-defined Type." The three built-in attributes can be represented by three leaf columns of the string built-in type, named C13, C14, C15, respectively. An auxiliary leaf column of the atomic-null built-in type is named C8. Leaf column C8 indicates whether the data for HomeAdr of the Address type is absent in a particular row. The street_address user-defined type has three attributes named Street_Number, Street_Name, and Apt. Number, respectively, as shown in the Table 1 in the fifth column labeled "user-defined attribute name" for the embedded user-defined types. The three attributes have the built-in types integer, string, string, respectively. The three built-in attributes can be represented by three leaf columns named C10, C11, C12, respectively. An auxiliary leaf column of the atomic-null built-in type is named C9. Leaf column C9 indicates whether the data for AddressPart1 of the street_address type is absent in a particular row.

In an alternative embodiment, a single auxiliary leaf column for the top-level user-defined type is used to indicate the presence of all contained user-defined types. For example, column C8 for the top-level user defined type Address contains a single number in which each bit indicates the presence or absence of a different user defined type included in the Address type. In this embodiment a first bit indicates the presence or absence of data for the Address type and a second bit indicates the presence or absence of data for the street_address type. In this embodiment, columns C8 and C16 suffice, and columns C9 and C17 are omitted.

The WorkAdr column has an Address user-defined type that has four attributes. Three attributes (City_Name, State_Name and Zip_Code) have built-in types, and AddressPart1 has a user-defined type. The user-defined type is a street_address type indicated in Table 1 by the fourth column labeled "embedded user-defined Type." The three built-in attributes can be represented by three leaf columns of the string built-in type, named C21, C22, C23, respectively. An auxiliary leaf column of the atomic-null built-in type is named C16. Leaf column C16 indicates whether the data for WorkAdr of the Address type is absent in a particular row. The street_address user-defined type has three attributes named Street_Number, Street_Name, and Apt. Number, respectively, as shown in the Table 1 in the fifth column labeled "user-defined attribute name" for the embedded user-defined types. The three attributes have the built-in types integer, string, string, respectively. The three built-in attributes can be represented by three leaf columns named C18, C19, C20, respectively. An auxiliary leaf column of the atomic-null built-in type is named C17. Leaf column C17 indicates whether the data for AddressPart1 of the street_address type is absent in a particular row.

An auxiliary leaf column C25 that indicates which leaf attributes are null is included among the leaf columns. This leaf column has the built-in type null-image. A null-image type column contains a value comprised of a set of bits corresponding to the other leaf columns in the table. For example, column C25 includes at least a 24 bit field, with ON bits indicating corresponding leaf columns have a value, and with OFF bits indicating corresponding leaf columns are null, i.e., have no values. A null-image type column is useful especially for reporting updates or inserts in a row that involve only a few columns of the row. The new values can be sent only for the changed columns, and the null-image can indicate which columns are to store the new values.

It is possible for two columns to have the same user-defined types. In some embodiments, the database server on a master site automatically names the attributes in the expanded set, rather than using the user-defined names, to assure that each different attribute has a unique name. The names generated by the database server on a particular site are used as the local names for the leaf columns at that site. Table 1 lists the local column names generated by the database server on master site 140. Note that both local column C15 and local column C23 have the user-defined name "Zip_Code."

A unique name, called a "fully qualified" name, can be generated by concatenating the given column name with the user-defined attribute names at each layer. For example, leaf attribute C12 can also be named "HomeAdr.AddressPart1.Apt_Number" and distinguished from leaf attribute C20 with a name of "WorkAdr.AddressPart1.Apt_Number." However, the local names are more compact and more efficient for use by a database server on a particular master site than are the fully qualified names.

As mentioned at the beginning of this section, according to some embodiments, a database object that includes one or more attributes with user-defined types is expanded to a database object that includes a new set of attributes with only built-in types before replication. For example, the Emp table with five columns including three with user-defined types, which themselves include two with embedded user-defined types, is expanded to an Emp table with 25 leaf columns having only built-in types. Then replication can make use of extant routines for marshalling and un-marshalling built-in types. Furthermore, inserts can be performed based on the null-image leaf attribute to avoid a combinatorial explosion of SQL code. For example, inserts can be performed based on the leaf column C25.

Different Local Names for Leaf Attributes

When a database server on a master site instantiates a database object on the master site, the database server determines the number and type of leaf attributes based on the definitions of the user-defined types and the data dictionary for the database object. The database server generates unique local names for the leaf attributes. Database servers on different master sites may generate different local names for the leaf attributes, a different order for the leaf attributes, or both. Thus when data or changes referencing leaf attributes are subsequently sent from a sending master site to an applying master site using local names for the leaf attributes at the sending site, the applying site might not apply the data or change to the correct leaf attribute.

For example, Table 2 compares the local column names in Table 1 assumed to be generated by database server 104a on master site 140 with local column names assumed to be generated by database server 104b on new master site 160. In some embodiments, not shown, the local name for a column named by a user that has built-in type is the same as the name given by the user. For example, the local name for the Birth column is Birth in some embodiments, rather than system generated names like C24 or Q25.

The leaf columns are given different names on the two master sites. The leaf column names on master site 140 have the letter "C" followed by a numeral. The leaf column names on master site 160 have the letter "Q" followed by a numeral. The leaf columns are generated at master site 140 in order from C1 through C25. The leaf columns are generated at master site 160 in a different order, from Q1 through Q25. The built-in type and the fully qualified name for each leaf column are also listed in Table 2. The fully qualified name can be generated based on the definitions of the user-defined types and the data dictionary for the database object.

TABLE 2

Example Difference Between Local Names on Different Master Sites

| Fully Qualified Name | Built-in Type | Site 140 column name | Site 160 column name |
|---|---|---|---|
| EmpID | string | C1 | Q2 |
| EmpName | atomic-null | C2 | Q3 |
| EmpName.Last | string | C3 | Q4 |
| EmpName.First | string | C4 | Q5 |
| EmpName.Middle | string | C5 | Q6 |
| EmpName.Prefix | string | C6 | Q7 |
| EmpName.Suffix | string | C7 | Q8 |
| HomeAdr | atomic-null | C8 | Q9 |
| HomeAdr.AddressPart1 | atomic-null | C9 | Q13 |
| HomeAdr.AddressPart1.Street_Number | integer | C10 | Q14 |
| HomeAdr.AddressPart1.Street_Name | string | C11 | Q15 |
| HomeAdr.AddressPart1.Apt_Number | string | C12 | Q16 |
| HomeAdr.City_Name | string | C13 | Q10 |
| HomeAdr.State_Name | string | C14 | Q11 |
| HomeAdr.Zip_Code | string | C15 | Q12 |
| WorkAdr | atomic-null | C16 | Q17 |
| WorkAdr.AddressPart1 | atomic-null | C17 | Q21 |
| WorkAdr.AddressPart1.Street_Number | integer | C18 | Q22 |
| WorkAdr.AddressPart1.Street_Name | string | C19 | Q23 |
| WorkAdr.AddressPart1.Apt_Number | string | C20 | Q24 |
| WorkAdr.City_Name | string | C21 | Q18 |
| WorkAdr.State_Name | string | C22 | Q19 |
| WorkAdr.Zip_Code | string | C23 | Q20 |
| Birth | date | C24 | Q25 |
| Auxiliary | null-image | C25 | Q1 |

Total Order Data for Leaf Attributes

According to some embodiments, replication metadata sent to a new master site for a database object includes total ordering data that specifies a sequence of leaf attributes using fully qualified names for the leaf attributes. By using the fully qualified names, the sequence of leaf attributes can be specified even when different local names are used for corresponding leaf attributes on the sending and applying master sites. By sending the sequence of leaf attributes, the contents of a database object subsequently sent as a sequence of values can be associated with corresponding leaf attributes, even when the order of leaf attributes is different at the two master sites. For example, in one embodiment the total ordering data includes the fully qualified name and the built-in type. Table 3, lists example total ordering data included in the metadata sent to the new master site. According to Table 3, contents of the leaf columns for a record for the table Emp will be sent in the order Auxiliary column with the null-image data, the EmpID column, the Birth column, etc. This is a different order than is stored at either master site.

TABLE 3

Total Ordering Data For Leaf Attributes.

| Fully Qualified Name | Built-in Type |
|---|---|
| Auxiliary | null-image |
| EmpID | string |
| Birth | date |
| EmpName | atomic-null |
| EmpName.Last | string |
| EmpName.First | string |
| EmpName.Middle | string |

TABLE 3-continued

Total Ordering Data For Leaf Attributes.

| Fully Qualified Name | Built-in Type |
|---|---|
| EmpName.Prefix | string |
| EmpName.Suffix | string |
| HomeAdr | atomic-null |
| HomeAdr.AddressPart1 | atomic-null |
| HomeAdr.AddressPart1.Street_Number | integer |
| HomeAdr.AddressPart1.Street_Name | string |
| HomeAdr.AddressPart1.Apt_Number | string |
| HomeAdr.City_Name | string |
| HomeAdr.State_Name | string |
| HomeAdr.Zip_Code | string |
| WorkAdr | atomic-null |
| WorkAdr.AddressPart1 | atomic-null |
| WorkAdr.AddressPart1.Street_Number | integer |
| WorkAdr.AddressPart1.Street_Name | string |
| WorkAdr.AddressPart1.Apt_Number | string |
| WorkAdr.City_Name | string |
| WorkAdr.State_Name | string |
| WorkAdr.Zip_Code | string |

Associating Total Order Data with Local Leaf Attributes

In the illustrated embodiments, the local names are associated with the fully qualified name in the total order data because both are generated from the data dictionary and the definition of user-defined types. For example, each line of Table 2 shows the association of one fully qualified name with the local name for a leaf column generated by the database server at master site 140. This association can be generated once at master site 140 and stored, or generated at master site 140 on demand. Each line of Table 2 also shows the association of one fully qualified name with the local name for a leaf column generated by the database server at master site 160. This association can be generated once at master site 160 and stored, or generated at master site 160 on demand.

In some embodiments the local name might be determined independently of the data dictionary received from the sending master site, even for built-in types. For example, as described in the background, data from the Emp table on master site 140 may be replicated to an Emp table, on master site 160, that uses EmpNumber instead of EmpID as the name for the column holding the employee identification number. In this embodiment, a user provides data indicating an association between the name used in the total order data and the local name. For example, the user provides a data structure that holds in one record a first name (e.g., EmpID) used in the total order data sent from a remote master site and a second, different name (e.g., EmpNumber) used on the local master site.

Replication Metadata

Figure 4:
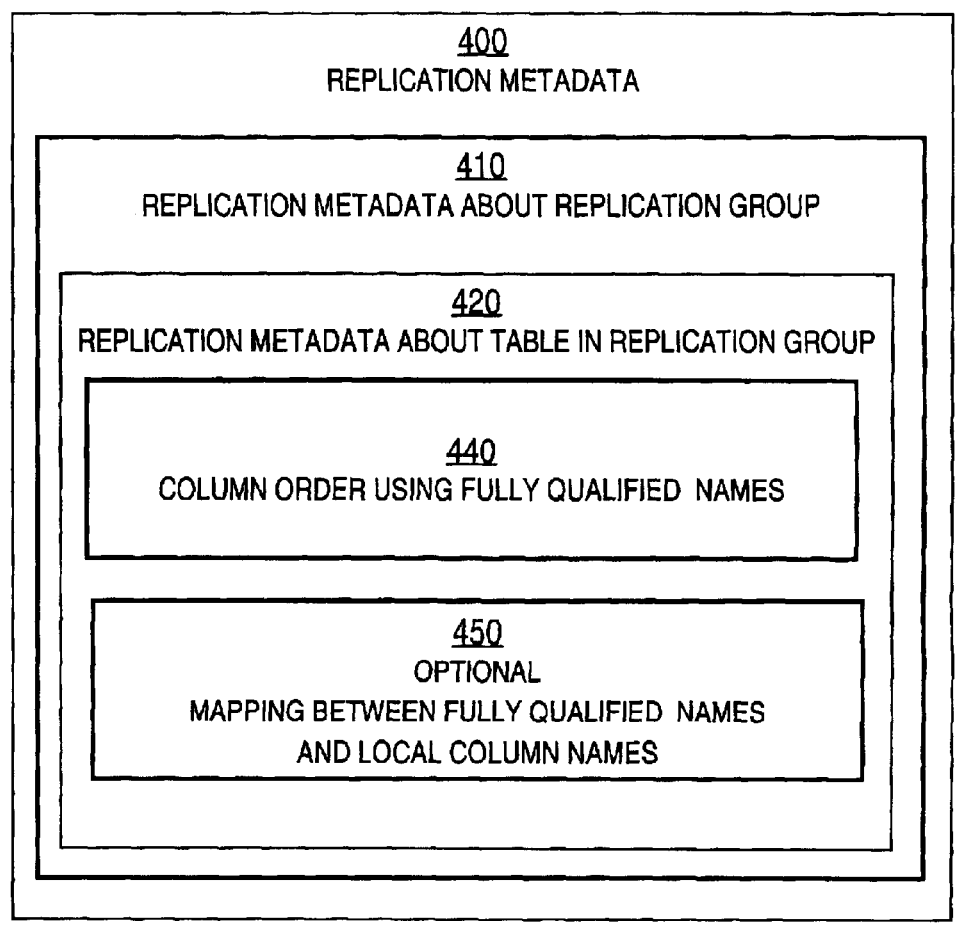
FIG. 4 is a block diagram that illustrates contents of a replication metadata data structure, according to one embodiment.

FIG. 4 is a block diagram that illustrates contents of a replication metadata data structure 400, according to one embodiment. As in the conventional replication, the replication metadata 400 includes replication metadata 410 about the replication group. Replication metadata 410 about the replication group includes data indicating the database objects in the replication group. As in the conventional replication, the replication metadata 410 about the replication group includes replication metadata 420 about one of the database objects in the replication group. For example, the replication metadata 420 about one of the database objects includes information about the Emp table being replicated to the new master site.

According to embodiments of the present invention, the replication metadata 420 about the database object includes total order data 440 indicating the order of leaf attributes. For example, the total order data 440 includes a sequence of leaf columns. The total order data 440 indicates each leaf column built-in type and the fully qualified leaf column name.

According to some embodiments, the replication metadata 420 about the database objects includes a mapping 450 between the leaf attribute name used in the total order data and the local name of the corresponding leaf attribute in the copy of the database object on the new master site. This mapping 450 may be omitted in embodiments in which the association of the fully qualified names with the local names for leaf attributes may be generated by the database server 104b at the local master site 160 based on the data in the data dictionary 114b and the definition data for the user-defined types in data structure 120b. The mapping 450 is not omitted in embodiments in which the local name is independent of the name in the data dictionary received from the remote master site. For example, the mapping 450 stores data, provided by a user of the database system, which associates the name "EmpID" received from the sending master site 140 with the name "EmpNumber" used in the local table.

Sending Contents of Database Object to Remote Site

FIG. 5A is a flowchart that illustrates steps performed by a database server for sending a user-defined object according to an embodiment 350a of step 350 of the method depicted in FIG. 3.

In step 505, a set of leaf attributes is determined for a database object in a replication group that has an attribute with a user-defined type. If the database object does not include any attributes with user-defined types, then the attributes of the database objects are the leaf attributes of the database object.

In step 507, local and normative names are generated for the leaf attributes. A normative name is a name for a leaf attribute that can be reached by every master site that replicates the database object. For example, in some embodiments, the normative name is the fully qualified name formed by concatenating the names given by users for the attribute of the database object and the attributes of any user-defined types involved. The fully qualified name can be generated based on the information in the data dictionary and the information in the data structure for user-defined types. In embodiments with only built-in types for attributes of a database object, the normative name may be the name given by the user for the attribute. Local names are generated for leaf attributes using any method available at the time the replication process for the database system is implemented.

In step 510, a sequence of leaf attributes is determined for sending contents of the database object to another master site. In some embodiments, the sequence is used only for propagating to other master sites changes to the contents of the database object at one master site. In other embodiments, the sequence is also used for transferring the contents of the database object when the database object is first instantiated on a new master site. The sequence can be determined using any method known in the art at the time the database system is implemented.

In step 515, sequence data indicating the order of all leaf attributes is sent to the new master site. In some embodiments, the sequence data includes the normative names for the leaf attributes. For example, the sequence data includes the fully qualified names of the leaf attributes. In some embodiments, the sequence data also includes the built-in types for the leaf attributes. The sequence data is sent using any method known in the art at the time the database system replication process is implemented. For example, a message is sent over a network from a database server on one site to a database server on a new master site.

In step 520 contents of a database object are sent to the new master site according to the sequence of leaf attributes sent in the sequence data. For example, values for the columns in each row are sent according to the sequence listed in Table 3, above. Step 520 is omitted in embodiments in which the sequence data is used only for changes, and not for the initial loading of data into a newly instantiated database object on a new master site.

In step 525 changes in contents of a database object are sent to a remote master site according to the sequence of leaf attributes sent in the sequence data. For example, if data stored in an employee row is changed to provide a new home street address for the employee, a value for the employee identification to identify the affected row is sent along with values for the leaf columns of the street address. In this example, the leaf columns that do not receive new values are not sent, and are indicated by the OFF bits in the auxiliary column having the null-image type. All values that are sent are sent in an order given by the sequence listed in Table 3, above. Accordingly, a value for the auxiliary column of the null-image type is sent first, followed by the value of the EmpID column, followed by a new value for HomeAdr.AddressPart1.Street_Number, then a new value for HomeAdr.AddressPart1.Street_Name, and then a new value for HomeAdr.AddressPart1.Apt_Number.

Receiving Contents of Database Object from Remote Site

FIG. 5B is a flowchart that illustrates steps performed by a database server for receiving a user-defined object according to an embodiment 350b of step 350 of the method depicted in FIG. 3.

In step 530, it is determined that a database object includes a particular attribute of a user-defined type. The user-defined type has a particular set of leaf attributes. The leaf attributes are determined based on the user-defined type in the data dictionary and the information in the data structure for user-defined types. For example, the leaf attributes Q1 through Q25 on the new master site 160 are determined based on the data dictionary and definition of user-defined types. If the database object does not include any attributes with user-defined types, then the attributes of the database objects are also the leaf attributes of the database object.

In step 540, a set of local names is associated with a set of normative names for the leaf attributes to form a mapping between local and normative names. For example, local names Q1 through Q25 are associated with normative names. In some embodiments the mapping that associates the local names with the normative names is based on data received at the new master site rather than on a data dictionary. For example, data is received indicating the name "EmpID" is associated with the local name "EmpNumber." The data is received in any manner known in the art at the time the replication process is implemented. For example, in one embodiment, the data is received from a user of the database system. In another embodiment, the data is stored in a data structure on a file transmitted to the new master site.

Figure 5C:
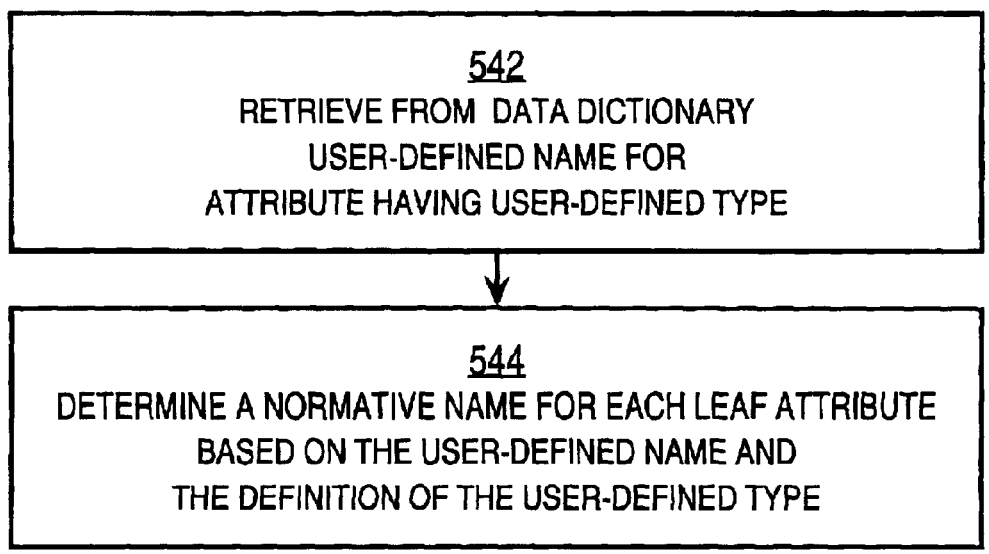
FIG. 5C is a flowchart that illustrates steps performed by a database server for mapping local names to normative names for leaf attributes according to an embodiment of one step of the method depicted in FIG. 5B.

In some embodiments with user-defined types, the mapping is performed according to the steps illustrated in FIG. 5C. FIG. 5C is a flowchart that illustrates steps performed by a database server for mapping local names to normative names for leaf attributes according to embodiment 540a of step 540 of the method depicted in FIG. 5B. In step 542, a user given name for an attribute having a user-defined type is retrieved from the data dictionary received in step 330. For example, the data dictionary includes a user-given column name "HomeAdr" of user-defined type "Address."

In step 544, a normative name is determined for each leaf attribute based on the user given name and the definition of the user-defined type received in step 320. For example, a fully qualified name for each leaf column is based on the user given name and the definition of the user-defined type. In the example of Table 2, for the leaf column with local name Q10, the name "HomeAdr.City_Name" is based on the user given name "HomeAdr" of the column in the data dictionary and the attribute named "City_Name" in the definition of the user-defined type "Address." The local name Q10 is associated with the normative name "HomeAdr.City_Name." The associated local and normative names are stored in a data structure in one embodiment. In another embodiment, the normative name associated with a local name is determined on demand based on the data dictionary and the definitions in the data structure for user-defined types.

In step 550, sequence data is received that indicates the sequence of leaf attributes using normative names. For example, the total order data in Table 3 is received. The total order data in Table 3 uses the fully qualified names for the leaf attributes.

In step 560, values representing at least some of the contents of a database object are received according to the sequence of leaf attributes in the sequence data. The values may be the full data in each data item in the database object, or just the changes to one or more data items in the database object. For example, values for the columns in each row are received according to the sequence listed in Table 3, above.

In some embodiments, the sequence data is used only for changes, and not for the initial loading of data into a newly instantiated database object on a new master site. For example, if data stored in an employee row is changed at master site 140 to provide a new home street address for the employee, a value for the employee identification to identify the affected row is received along with values for the leaf columns of the street address. In this example, the leaf columns that do not have new values are not received, and are indicated by the OFF bits in the auxiliary column having the null-image type. All values that are received are received in an order given by the sequence listed in Table 3, above. Accordingly, a value for the auxiliary column of the null-image type is received first, indicating OFF bits except for ON bits associated with four leaf columns. Based on the ON bits and the sequence data, the next four values that are received the value of the EmpID column, followed by a new value for HomeAdr.AddressPart1.Street_Number, then a new value for HomeAdr.AddressPart1.Street_Name, and then a new value for HomeAdr.AddressPart1.Apt_Number.

In step 570, the values representing the contents, such as the changes, are stored in the local database object in the attribute having the local name that corresponds to the normative name. For example, the values associated with the fully qualified names EmpID, HomeAdr.AddressPart1.Street_Number, HomeAdr.AddressPart1.Street_Name, and HomeAdr.AddressPart1.Apt_Number are stored in the local Emp table in the corresponding leaf columns. According to the mapping included in Table 2, above, the corresponding leaf columns have local names Q2, Q14, Q15, Q16, respectively. The row where the change is made is the row that has a value in local column Q2 that matches the value associated with the fully qualified name EmpID.

As described above, replication metadata is sent from one master site to a new master site. The replication metadata includes total ordering data that specifies a sequence of leaf attributes using fully qualified names for the leaf attributes. By using the fully qualified names, the sequence of leaf attributes can be specified even when different local names are used for corresponding leaf attributes on the sending and applying master sites. By sending the sequence of leaf attributes, the contents of a database object subsequently sent as a sequence of values can be associated with corresponding leaf attributes, even when the order of leaf attributes is different at the two master sites.

Hardware Overview

Figure 6:
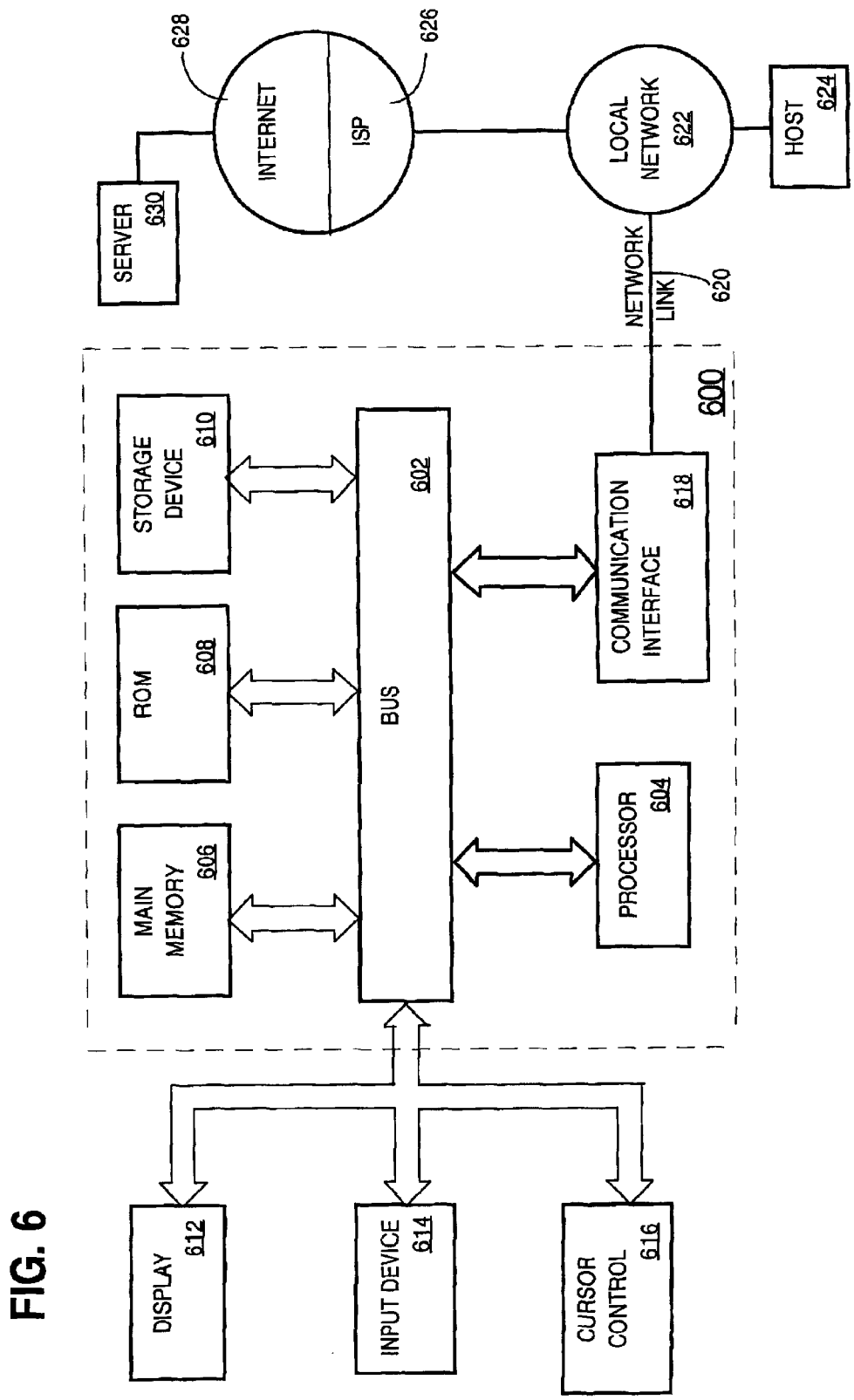
FIG. 6 is a block diagram that illustrates a computer system 600 upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for replicating a database object, of a relational database managed by a database system, from a first node on a network to a second node on the network, the method comprising the steps of:

determining that the database object on the first node includes a user-defined object defined by a user of the database system, and during a replication operation that involves the first node and the second node, causing the database system to copy data that defines the database object, including data that defines the user-defined object, to the second node of the network.

2. The method of claim 1, wherein:

the user-defined object comprises a combination of elements, and the step of causing the database system to copy the database object includes causing the database system to copy, as part of said database object, said combination of elements.

3. The method of claim 1, further comprising the step of causing the database system to copy from the first node to the second node a data structure holding a definition of the user-defined object.

4. The method of claim 1, wherein the database system performs the further steps of:

causing the database object to be instantiated on the second node; and copying data from the database object on the first node into the database object on the second node.

5. The method of claim 1, wherein the step of causing the database system to copy the database object includes causing the database system to copy a table for logically arranging data items in rows and columns.

6. The method of claim 1, wherein the step of causing the database system to copy the database object includes causing the database system to copy a view specifying a set of rows and columns from one or more tables in the database.

7. The method of claim 1, wherein the step of causing the database system to copy the database object includes causing the database system to copy a procedure for operating on a user-defined object.

8. The method of claim 1, wherein the database object is a key column of a table of rows and columns.

9. A method for replicating a database object, of a relational database managed by a database system, from a first node on a network to a second node on the network, the method comprising the steps of:

determining that the database object on the first node includes a user-defined object defined by a user of the database system, and causing the database system to copy the database object, including the user-defined object, to the second node of the networks wherein:

the database object is a table for logically arranging data items in rows and columns, each column having a column type, the data items in each column having a data type corresponding to the column type of the column in which the data items reside, the column types for the columns in the table stored in a data structure describing the table;

the user-defined object is a data item in a first column of a first row of the table; and the step of causing the database system to copy the database object includes causing the database system to copy, as part of said database object, said data item from said first column of said first row of the table.

10. A method for replicating a database object, of a relational database managed by a database system, from a first node on a network to a second node on the network, the method comprising the steps of:

determining that the database object on the first node includes a user-defined object defined by a user of the database system, and causing the database system to copy the database object, including the user-defined object, to the second node of the network, wherein the database system performs the further steps of:

copying a name of a user-defined type of the user-defined object from the first node to the second node;

copying a first definition of the user-defined type from the first node to the second node; and after copying the first definition of the user-defined type, and after copying the name of the user-defined type, copying a second definition of the database object from the first node to the second node, the second definition including the name of the user-defined type.

11. A method for replicating a database object, of a relational database managed by a database system, from a first node on a network to a second node on the network, the method comprising the steps of:

determining that the database object on the first node includes a user-defined object defined by a user of the database system, and causing the database system to copy the database object to the second node of the network, including performing the steps of:

copying a name of a user-defined type of the user-defined object from the first node to the second node;

copying a first definition of the user-defined type from the first node to the second node;

copying a second definition of the database object from the first node to the second node, the second definition including the name of the user-defined type;

causing the database object to be instantiated on the second node; and copying data from the database object on the first node into the database object on the second node.

12. A method for use within a relational database system for generating on a second node a replicated database object based on a particular database object on a first node, the method comprising the steps of:

receiving, at the second node, sequence data indicating a sequence of identifiers for attributes of the particular database object;

receiving, at the second node, a series of values from the first node; and storing the series of values at locations within the replicated database object based on the sequence data and a mapping between the attributes of the particular database object and attributes of the replicated database object.

13. The method of claim 12, wherein the sequence data also indicates a sequence of built-in types corresponding to the sequence of identifiers.

14. The method of claim 13, said step of generating the mapping further comprising the step of receiving at the second node data indicating a first identifier of the identifiers in association with a first local name of the local names.

15. The method of claim 12, further comprising the step of generating the mapping based on associating the identifiers for the attributes of the particular database object with corresponding local names for the attributes of the replicated database object.

16. The method of claim 12, wherein:
the particular database object includes a particular attribute having a user-defined type defined by a user of the relational database system based on a particular combination of leaf attributes;
each leaf attribute has a built-in type and a leaf name; and
the sequence data indicates a sequence of leaf names for the leaf attributes.

17. The method of claim 16, further comprising the step of generating the mapping at the second node based on associating the leaf names with corresponding local names for the leaf attributes of the particular attribute of the replicated database object.

18. The method of claim 17, said step of generating the mapping further comprising the steps of:
generating local names for each leaf attribute in the particular combination of leaf attributes; and
generating leaf names for each leaf attribute in the particular combination of leaf attributes.

19. The method of claim 18, further comprising the step of receiving at the second node definition data describing the user-defined type.

20. The method of claim 19, said step of generating the mapping further comprising the step of determining the particular combination of leaf attributes based on the definition data.

21. The method of claim 19, said step of generating leaf names further comprising the step of generating leaf names based at least in part on the definition data.

22. The method of claim 18, further comprising the step of receiving at the second node data that indicates a user-defined name for the particular attribute.

23. The method of claim 22, said step of generating leaf names further comprising the step of generating leaf names based at least in part on the user-defined name for the particular attribute.

24. The method of claim 16, wherein each leaf name is a fully-qualified name that includes a user-defined name for the particular attribute.

25. The method of claim 16, wherein an atomic-null attribute of the particular database object indicates whether values for the particular attribute having the user-defined type are absent in the series of values from the first node.

26. The method of claim 12, wherein a null-image attribute of the particular database object indicates whether a value for a second attribute of the particular database object is absent in the series of values from the first node.

27. The method of claim 12, wherein:
the particular database object is a database table; and
the attributes of the particular database object are columns of the database table.

28. A method for use within a relational database system for generating on a second node a replicated database object based on a particular database object on a first node, the method comprising the steps of:
determining a sequence for sending to the second node values of attributes of the particular database object;
sending to the second node sequence data indicating the sequence, the sequence data including for each attribute in the sequence a built-in type defined by the database system and a user-defined name defined by a user of the database system; and
sending to the second node a series of values from the particular database object based on the sequence.

29. A method for use within a relational database system for generating on a second node a replicated database object based on a particular database object on a first node, the method comprising the steps of:
determining a set of leaf attributes corresponding to a particular attribute of the particular database object, the particular attribute having a user-defined type defined by a user of the database system, each leaf attribute in the set having a built-in type defined by the database system and a leaf name; and
sending each value of the user-defined type that resides in the particular attribute as a set of values corresponding to the set of leaf attributes.

30. The method of claim 29, wherein:
the method further comprises the step of sending, to the second node, sequence data indicating a sequence of leaf attributes corresponding to the set of values; and
said step of sending the set of values is performed according to the sequence of leaf attributes indicated in the sequence data.

31. The method of claim 29, wherein
a first leaf attribute of the set of leaf attributes has a null-image type; and
a value corresponding to the first leaf attribute indicates which other leaf attributes of the set of leaf attributes correspond to other values in the set of values.

32. A computer-readable medium carrying one or more sequences of instructions for replicating a database object of a relational database managed by a database system from a first node on a network to a second node on the network, wherein execution of the one or more sequences of instructions by one or more processors causes the one or more processors to perform the steps of:
determining that the database object on the first node includes a user-defined object defined by a user of the database system, and
during a replication operation that involves the first node and the second node, causing the database system to copy data that defines the database object, including data that defines the user-defined object, to the second node of the network.

33. The computer-readable medium of claim 32, wherein:
the user-defined object comprises a combination of elements; and
the step of causing the database system to copy the database object includes causing the database system to copy, as part of said database object, said combination of elements.

34. The computer-readable medium of claim 32, wherein execution of the one or more sequences of instructions by one or more processors further causes the one or more processors to perform the step of copying from the first node to the second node a data structure holding a definition of the user-defined object.

35. The computer-readable medium of claim 32, wherein execution of the one or more sequences of instructions by the one or more processors further causes the one or more processors to perform the steps of:
    instantiating the database object on the second node; and
    copying data from the database object on the first node into the database object on the second node.

36. The computer-readable medium of claim 32, wherein the step of causing the database system to copy the database object includes causing the database system to copy a table for logically arranging data items in rows and columns.

37. The computer-readable medium of claim 32, wherein the step of causing the database system to copy the database object includes causing the database system to copy a view specifying a set of rows and columns from one or more tables in the database.

38. The computer-readable medium of claim 32, wherein the step of causing the database system to copy the database object includes causing the database system to copy a procedure for operating on a user-defined object.

39. The computer-readable medium of claim 32, wherein the database object is a key column of a table of rows and columns.

40. A computer-readable medium carrying one or more sequences of instructions for replicating a database object of a relational database managed by a database system from a first node on a network to a second node on the network, wherein execution of the one or more sequences of instructions by one or more processors causes the one or more processors to perform the steps of:
    determining that the database object on the first node includes a user-defined object defined by a user of the database system, and
    causing the database system to copy the database object, including the user-defined object, to the second node of the network, wherein:
    the database object is a table for logically arranging data items in rows and columns, each column having a column type, the data items in each column having a data type corresponding to the column type of the column in which the data items reside, the column types for the columns in the table stored in a data structure describing the table;
    the user-defined object is a data item in a first column of a first row of the table; and
    the step of causing the database system to copy the database object includes causing the database system to copy, as part of said database object, said data item from said first column of said first row of the table.

41. A computer-readable medium carrying one or more sequences of instructions for replicating a database object of a relational database managed by a database system from a first node on a network to a second node on the network, wherein execution of the one or more sequences of instructions by one or more processors causes the one or more processors to perform the steps of:
    determining that the database object on the first node includes a user-defined object defined by a user of the database system;
    causing the database system to copy the database object, including the user-defined object, to the second node of the network;
    copying a name of a user-defined type of the user-defined object from the first node to the second node;
    copying a first definition of the user-defined type from the first node to the second node; and
    after copying the first definition of the user-defined type, and after copying the name of the user-defined type, copying a second definition of the database object from the first node to the second node, the second definition including the name of the user-defined type.

42. A computer-readable medium carrying one or more sequences of instructions for replicating a database object of a relational database managed by a database system from a first node on a network to a second node on the network, wherein execution of the one or more sequences of instructions by one or more processors causes the one or more processors to perform the steps of:
    determining that the database object on the first node includes a user-defined object defined by a user of the database system, and
    copying the database object to the second node of the network, including performing the steps of:
        copying a name of a user-defined type of the user-defined object from the first node to the second node;
        copying a first definition of the user-defined type from the first node to the second node;
        copying a second definition of the database object from the first node to the second node, the second definition including the name of the user-defined type;
        instantiating the database object on the second node; and
        copying data from the database object on the first node into the database object on the second node.

43. A computer-readable medium carrying one or more sequences of instructions for use within a relational database system for generating on a second node a replicated database object based on a particular database object on a first node, wherein execution of the one or more sequences of instructions by one or more processors on the second node causes the one or more processors to perform the steps of:
    receiving sequence data indicating a sequence of identifiers for attributes of the particular database object;
    receiving a series of values from the first node; and
    storing the series of values at locations within the replicated database object based on the sequence data and a mapping between the attributes of the particular database object and attributes of the replicated database object.

44. The computer-readable medium of claim 43, wherein the sequence data also indicates a sequence of built-in types corresponding to the sequence of identifiers.

45. The computer-readable medium of claim 44, said step of generating the mapping further comprising the step of receiving at the second node data indicating a first identifier of the identifiers in association with a first local name of the local names.

46. The computer-readable medium of claim 43, wherein the one or more sequences of instructions further cause the one or more processors to perform the step of generating the mapping based on associating the identifiers for the attributes of the particular database object with corresponding local names for the attributes of the replicated database object.

47. The computer-readable medium of claim 43, wherein:
    the particular database object includes a particular attribute having a user-defined type defined by a user of the relational database system based on a particular combination of leaf attributes;

each leaf attribute has a built-in type and a leaf name; and the sequence data indicates a sequence of leaf names for the leaf attributes.

48. The computer-readable medium of claim 47, wherein the one or more sequences of instructions further cause the one or more processors to perform the step of generating the mapping at the second node based on associating the leaf names with corresponding local names for the leaf attributes of the particular attribute of the replicated database object.

49. The computer-readable medium of claim 48, said step of generating the mapping further comprising the steps of:

generating local names for each leaf attribute in the particular combination of leaf attributes; and generating leaf names for each leaf attribute in the particular combination of leaf attributes.

50. The computer-readable medium of claim 49, wherein the one or more sequences of instructions further cause the one or more processors to perform the step of receiving definition data describing the user-defined type.

51. The computer-readable medium of claim 50, said step of generating the mapping further comprising the step of determining the particular combination of leaf attributes based on the definition data.

52. The computer-readable medium of claim 50, said step of generating leaf names further comprising the step of generating leaf names based at least in part on the definition data.

53. The computer-readable medium of claim 49, wherein the one or more sequences of instructions further cause the one or more processors to perform the step of receiving data that indicates a user-defined name for the particular attribute.

54. The computer-readable medium of claim 53, said step of generating leaf names further comprising the step of generating leaf names based at least in part on the user-defined name for the particular attribute.

55. The computer-readable medium of claim 47, wherein each leaf name is a fully-qualified name that includes a user-defined name for the particular attribute.

56. The computer-readable medium of claim 47, wherein an atomic-null attribute of the particular database object indicates whether values for the particular attribute having the user-defined type are absent in the series of values from the first node.

57. The computer-readable medium of claim 43, wherein a null-image attribute of the particular database object indicates whether a value for a second attribute of the particular database object is absent in the series of values from the first node.

58. The computer-readable medium of claim 43, wherein:

the particular database object is a database table; and the attributes of the particular database object are columns of the database table.

59. A computer-readable medium carrying one or more sequences of instructions for use within a relational database system for generating on a second node a replicated database object based on a particular database object on a first node, wherein execution of the one or more sequences of instructions by one or more processors on the first node causes the one or more processors to perform the steps of:

determining a sequence for sending to the second node values of attributes of the particular database object;

sending to the second node sequence data indicating the sequence, the sequence data including for each attribute in the sequence a built-in type defined by the database system and a user-defined name defined by a user of the database system; and sending to the second node a series of values from the particular database object based on the sequence.

60. A computer-readable medium carrying one or more sequences of instructions for use within a relational database system for generating on a second node a replicated database object based on a particular database object on a first node, wherein execution of the one or more sequences of instructions by one or more processors on the second node causes the one or more processors to perform the steps of:

determining a set of leaf attributes corresponding to a particular attribute of the particular database object, the particular attribute having a user-defined type defined by a user of the database system, each leaf attribute in the set having a built-in type defined by the database system and a leaf name; and sending each value of the user-defined type that resides in the particular attribute as a set of values corresponding to the set of leaf attributes.

61. The computer-readable medium of claim 60, wherein:

the one or more sequences of instructions further cause the one or more processors to perform the step of sending, to the second node, sequence data indicating a sequence of leaf attributes corresponding to the set of values; and said step of sending the set of values is performed according to the sequence of leaf attributes indicated in the sequence data.

62. The computer-readable medium of claim 60, wherein a first leaf attribute of the set of leaf attributes has a null-image type; and a value corresponding to the first leaf attribute indicates which other leaf attributes of the set of leaf attributes correspond to other values in the set of values.

* * * * *

UNITED STATES PATENT AND TRADEMARK OFFICE
CERTIFICATE OF CORRECTION

PATENT NO.    : 6,889,229 B1  
DATED         : May 3, 2005  
INVENTOR(S)   : Lik Wong et al.

It is certified that error appears in the above-identified patent and that said Letters Patent is hereby corrected as shown below:

<u>Title page,</u>
Item [57], ABSTRACT,
Line 8, delete "user-defined defined" and insert -- user-defined --.

Signed and Sealed this

Twenty-eighth Day of June, 2005

JON W. DUDAS
*Director of the United States Patent and Trademark Office*